(12) United States Patent
Kalfus et al.

(10) Patent No.: US 9,683,097 B1
(45) Date of Patent: Jun. 20, 2017

(54) POLYMER BLEND, METHOD FOR MAKING THE SAME AND ROOFING MEMBRANE CONTAINING THE SAME

(71) Applicant: ExxonMobil Chemical Patents Inc., Baytown, TX (US)

(72) Inventors: Jan Kalfus, Spring, TX (US); Liang Li, Shanghai (CN); Narayanaswami Dharmarajan, Houston, TX (US); Felix M. Zacarias, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/214,658

(22) Filed: Jul. 20, 2016

Related U.S. Application Data

(60) Provisional application No. 62/266,994, filed on Dec. 14, 2015.

(30) Foreign Application Priority Data

Mar. 8, 2016 (EP) ..................................... 16159066

(51) Int. Cl.
*E04D 5/06* (2006.01)
*C08J 5/00* (2006.01)
*C08L 23/12* (2006.01)

(52) U.S. Cl.
CPC ................ *C08L 23/12* (2013.01); *C08J 5/00* (2013.01); *E04D 5/06* (2013.01); *C08J 2323/12* (2013.01); *C08J 2423/12* (2013.01); *C08L 2314/02* (2013.01); *C08L 2314/06* (2013.01)

(58) Field of Classification Search
CPC .. C08L 23/12; C08L 2314/02; C08L 2314/06; C08J 5/00; C08J 2423/12; C08J 2323/12; E04D 5/06
See application file for complete search history.

(56) References Cited

U.S. PATENT DOCUMENTS

| | | | | |
|---|---|---|---|---|
| 3,603,221 | A | * 9/1971 | Barton | ................. C08K 3/0033 404/31 |
| 5,260,366 | A | * 11/1993 | Mitsuno | ................. C08L 23/10 524/426 |
| 5,723,546 | A | 3/1998 | Sustic | |

(Continued)

FOREIGN PATENT DOCUMENTS

| | | |
|---|---|---|
| EP | 2 072 546 | 6/2009 |
| EP | 2 660 287 | 11/2013 |

(Continued)

*Primary Examiner* — Brent W Herring
(74) *Attorney, Agent, or Firm* — Siwen Chen; Kevin M. Faulkner

(57) ABSTRACT

A polymer blend comprising 10 to 90 parts by weight of a propylene-based polymer component having a weight average molecular weight of at least 200 kg·mol$^{-1}$; and 20 to 80 parts by weight of a propylene-based elastomer component comprising structural units derived from propylene and at least one of ethylene and C4-C12 alpha-olefins having a weight average molecular weight in the range from 5 to 50 kg·mol$^{-1}$, method for making a membrane comprising the same and roofing membrane comprising the same. The polymer blend is particularly suitable for making roofing membrane due to advantageous elastic modulus in broad temperature ranges.

25 Claims, 2 Drawing Sheets

(56) References Cited

U.S. PATENT DOCUMENTS

| | | | |
|---|---|---|---|
| 6,543,199 B1* | 4/2003 | Tomlinson | E04D 5/06 156/308.2 |
| 6,743,864 B2 | 6/2004 | Glogovsky et al. | |
| 6,750,284 B1 | 6/2004 | Dharmarajan et al. | |
| 6,953,828 B2 | 10/2005 | Dharmarajan et al. | |
| 7,666,491 B2 | 2/2010 | Yang et al. | |
| 7,927,595 B1 | 4/2011 | June et al. | |
| 8,076,398 B2* | 12/2011 | Gonzalez Leon | C04B 26/26 524/59 |
| 8,664,336 B2* | 3/2014 | Eswaran | C08L 23/142 525/191 |
| 8,769,903 B2 | 7/2014 | Svec | |
| 8,846,204 B2* | 9/2014 | Lu | B32B 27/32 156/244.23 |
| 9,434,827 B2* | 9/2016 | Frei | C08J 5/18 |
| 9,458,311 B2* | 10/2016 | McCune | C08L 23/0815 |
| 2005/0032959 A1 | 2/2005 | Cheung et al. | |
| 2006/0046084 A1 | 3/2006 | Yang et al. | |
| 2007/0208139 A1 | 9/2007 | Raulie et al. | |
| 2009/0076216 A1* | 3/2009 | Kiss | C08F 10/00 524/579 |
| 2009/0124153 A1* | 5/2009 | Dharmarajan | C08L 23/10 442/328 |
| 2010/0197844 A1 | 8/2010 | Yang et al. | |
| 2010/0255739 A1 | 10/2010 | Black et al. | |
| 2011/0034593 A1* | 2/2011 | Gonzalez Leon | C04B 26/26 524/59 |
| 2012/0046395 A1* | 2/2012 | Gonzalez Leon | C04B 26/26 524/59 |
| 2012/0276369 A1* | 11/2012 | Jing | B82Y 30/00 428/331 |
| 2013/0011669 A1* | 1/2013 | Lu | B32B 27/32 428/349 |
| 2013/0059979 A1* | 3/2013 | Eswaran | C08L 23/142 525/194 |
| 2014/0288228 A1 | 9/2014 | Mehta et al. | |
| 2015/0065656 A1* | 3/2015 | McCune | C08L 23/0815 525/240 |
| 2015/0119515 A1* | 4/2015 | Frei | C08J 5/18 524/437 |
| 2015/0232651 A1 | 8/2015 | Gössi et al. | |
| 2015/0314511 A1* | 11/2015 | Stoiljkovic | B29C 47/0004 264/211 |
| 2016/0304393 A1* | 10/2016 | Jing | B82Y 30/00 |

FOREIGN PATENT DOCUMENTS

| | | | |
|---|---|---|---|
| JP | 2008266502 A * | 11/2008 | |
| WO | 03/050148 | 6/2003 | |
| WO | 2006/023117 | 3/2006 | |
| WO | WO 2010077769 A1 * | 7/2010 | C08J 3/005 |
| WO | 2010/115079 | 10/2010 | |
| WO | 2012/152802 | 11/2012 | |
| WO | 2014/001224 | 1/2014 | |
| WO | 2014/040914 | 3/2014 | |
| WO | 2014/105809 | 7/2014 | |
| WO | 2015/089359 | 6/2015 | |
| WO | 2016/137558 | 9/2016 | |

* cited by examiner

POLYMER BLEND, METHOD FOR MAKING THE SAME AND ROOFING MEMBRANE CONTAINING THE SAME

CROSS-REFERENCE TO RELATED APPLICATIONS

This application claims priority to and the benefit of U.S. Provisional Application No. 62/266,994, filed Dec. 14, 2015, and European Application No. 16159066.6, filed Mar. 8, 2016, all of which are incorporated by reference in their entireties.

The present application is related to U.S. Provisional Application Ser. No. 62/121,230, filed on Feb. 26, 2015 and entitled "Roofing Compositions Comprising Propylene-Based Elastomers," the contents of which are incorporated herein by reference in its entirety.

FIELD

The present invention relates to polymer blends based on propylene-based polymer and propylene-based elastomer and membranes based on such blends. In particular, the present invention relates to polymer blends based on high molecular weight polypropylene and propylene-based elastomers and membranes based on such blends. The present invention is useful, e.g., in making thermoplastic roofing membranes.

BACKGROUND

Membrane roofing is commonly used on flat or nearly flat roofs in North America, especially in commercial building structures with large roof surfaces, to prevent moisture penetration and move water off the roof. Common roof membrane materials include synthetic rubbers, thermoplastic plastics, asphalt, and modified bitumen. Roofing membranes can be custom-made to the precise sizes of the specific building roof surface in rolled transportable sheets, shipped to the construction site and then readily applied. The roofing membrane sheets can be made at a given width such as 10 feet (3 meters) or greater.

Compositions and membranes comprising thermoplastic olefin (TPO) polymers have recently found widespread use in the roofing industry for commercial buildings. TPO membranes are often fabricated as a composite structure including a reflective membrane (e.g., 1.0 to 1.5 millimeters thick) as an upper layer, a reinforcing polyester scrim fabric layer (e.g., 0.025 to 0.050 millimeter thick) as an intermediate layer, and a pigmented layer (e.g., 1.0 to 1.5 millimeters thick) as the lower layer. When the membrane is applied to the roof, the reflective upper layer is typically exposed to sunlight while the pigmented lower layer is attached to the roof insulation material.

During transport the rolls can be exposed to extreme heat conditions, such as from 40° C. to 100° C., which can lead to blocking of the rolls during installation. After installation, the membranes can be exposed during service to a wide range of conditions that may deteriorate or destroy the integrity of the membrane. As such, a membrane is desired that can withstand a wide variety of service temperatures, such as from −40° C. to 40° C.

PCT Application Publication No. WO 2010/115079A1 is directed to roofing membranes that contain compositions of Formula I that comprise (a) 30 to 50 wt % of a propylene-based elastomer, (b) 9 to 20 wt % of a plastomer, (c) from 7 to 20 wt % of an impact propylene-based elastomer, (d) 20 to 35 wt % of magnesium hydroxide, (e) 5 to 10 wt % of titanium dioxide, and (f) 1 to 2 wt % of additives; or compositions of Formula II that comprise (a) 32 to 48 wt % of a propylene-based elastomer, (b) 9 to 18 wt % of a plastomer, (c) 7 to 20 wt % of an impact propylene-based elastomer, (d) 25 to 35 wt % of magnesium hydroxide, (e) 4 to 6 wt % of titanium dioxide, (f) 0.75 to 1.5 wt % of UV inhibitor, (g) 0.2 to 0.45 wt % of antioxidant/stabilizer, (h) 0.15 to 0.4 wt % of thermal stabilizer, and (i) 0.1 to 0.2 wt % of lubricant. The propylene-based elastomer used in WO 2010/115079A1 was Vistamaxx™ 6102 Performance Polymer and the lubricant used was Asahi AX71 which is a mono or di-stearyl acid phosphate. The roofing membrane in WO 2010/115079A1 is formed around a scrim having reinforcing polyester threads.

PCT Application Publication No. WO 2014/001224A1 is directed to compositions comprising 40 to 75 wt % of at least one polypropylene-based elastomer and around 25 to 60 wt % of at least one random copolymer of polypropylene. The polypropylene-based elastomers used in WO 2014/001224A1 were Vistamaxx™ 3980, 6102, and 6202 Performance Polymers.

PCT Publication No. WO 2014/040914A1 is directed to thermoplastic mixtures that comprise at least one impact-resistant polypropylene copolymer and at least one ethylene-1-octene copolymer, where the weight ratio of impact-resistant polypropylene copolymer to ethylene-1-octene copolymer is in the range of 35:65 to 65:35.

U.S. Patent Application Serial No. 2010/0255739 A1 discloses roofing membrane with a composition having a polypropylene based elastomer, a plastomer, and an impact propylene-based elastomer. The total weight percent of propylene-based elastomer present in the composition may range from about 7 to 20 percent. It is disclosed therein that rolled sheets of such membrane can be supplied to the roofer and installed onsite using fasteners, adhesives and other means of fixation.

Additional background references include U.S. Patent Application Nos. 2006/0046084; 2007/208139; and 2010/197844; U.S. Pat. Nos. 6,743,864; 6,953,828; 6,750,284; 7,666,491; 7,927,595; and 8,769,903; and PCT Publication No. WO 2014/105809.

While such roofing membranes provide the workability for many applications, substitutes thereof with lower modulus at low temperature (e.g., temperature lower than −50° C.) and higher modulus at high temperature (e.g., temperature higher than 75° C.) are desired.

SUMMARY

It has been found that a polymer blend comprising a high molecular weight propylene-based polymer and a low molecular weight propylene-based elastomer can provide the desired combination of low-temperature modulus, ambient-temperature modulus, and high-temperature modulus, rendering it an excellent candidate material for roofing membrane.

Accordingly, a first aspect of the present invention provides a composition suitable for roofing membrane comprising 10 to 90 parts by weight of a propylene-based polymer component having a weight average molecular weight of at least 200 kg·mol$^{-1}$; and 20 to 80 parts by weight of a propylene-based elastomer copolymer component comprising structural units derived from propylene and at least one of ethylene and C4-C12 olefins having a weight average molecular weight in the range from 5 to 50 kg·mol$^{-1}$.

A second aspect of the present invention relates to a method for making a membrane, the method comprising: (i) providing a propylene-based elastomer component having a weight average molecular weight in the range from 5 to 50 kg·mol$^{-1}$; (ii) providing a propylene-based polymer component having a weight average molecular weight of at least 200 kg·mol$^{-1}$; (iii) mixing the propylene-ethylene component and the propylene-based polymer component to obtain a polymer blend material comprising from 10 to 90 parts by weight of the propylene-based elastomer component and from 20 to 80 parts by weight of the propylene-based polymer component; and (iv) forming a membrane from the polymer blend material.

A third aspect of the present invention relates to a method for insulating a roof top, comprising applying at least one layer of a membrane comprising a polymer blend over the roof top, wherein the polymer blend has a composition according to the first aspect of the present invention described summarily above and in greater detail below.

DETAILED DESCRIPTION

Figure 1:
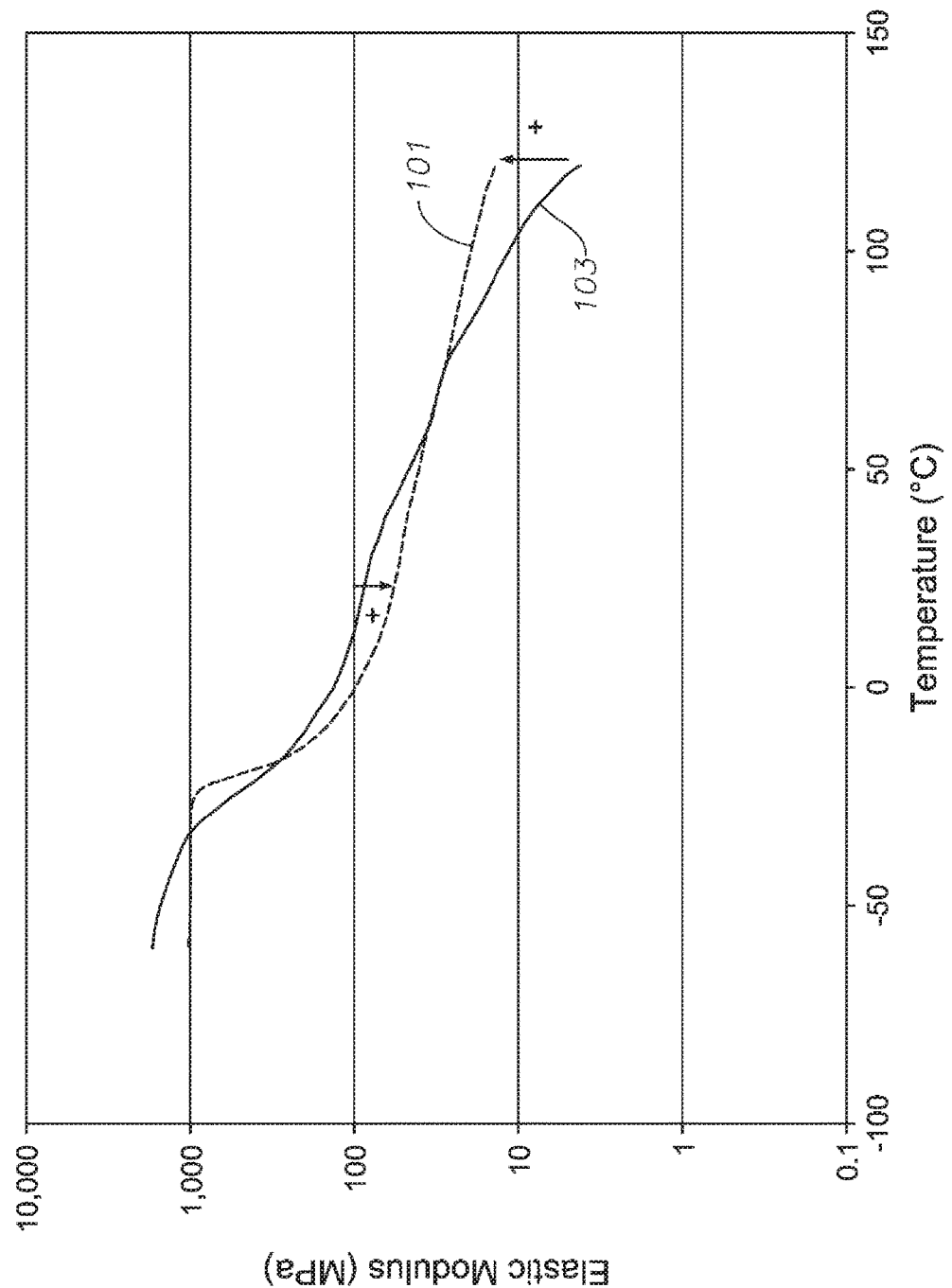
FIG. 1 is a graph comparing the in-phase elastic modulus of a blend of a propylene-based polymer and a propylene-based elastomer blend of the present invention as a function of temperature to that of a prior art roofing membrane material.

The invention is based on the concept that using low molecular weight propylene-based elastomers to deliver desired softness (e.g., softness in terms of elastic modulus in the range 80 to 120 MPa in the temperature range of 10° C. to 30° C.), of polypropylene based thermoplastic polyolefin blends. Metallocene catalyst can be used to synthesize propylene-based elastomers in broad range of molecular weights and ethylene contents, in a solution process. Propylene-based elastomers low in molecular weight and ethylene content, suitable for adhesives application, can be used as a softening agent for polypropylene that provides a convenient combination of mechanical properties and processability.

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the embodiments defined by the claims. The use of headings is for purposes of convenience only and does not limit the scope of the present invention.

All numerical values within the detailed description and the claims herein are modified by "about" or "approximately" the indicated value, and take into account experimental error and variations that would be expected by a person having ordinary skill in the art.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other agents that facilitate degradation. For the purpose of this disclosure, however, reactor grade polymers include those polymers that are reactor blends.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

The Propylene-Based Polymer (PBP) Component

The PBP component in the polymer blend of the present invention useful for roofing membrane desirably has a high molecular weight of at least 200 kg·mol$^{-1}$ (weight average) in order to keep tensile strength and puncture resistance of the membrane made therefrom at an acceptable level. Preferably, the PBP component has a weight average molecular weight in the range from MW(PBP)1 kg·mol$^{-1}$ to MW(PBP)2 kg·mol$^{-1}$, where MW(PBP)1 and MW(PBP)2 can be, independently, 200, 210, 220, 230, 240, 250, 260, 270, 280, 290, 300, 350, 400, 450, 500, 550, 600, 650, 700, 750, 800, as long as MW(PBP)1<MW(PBP)2. If the weight average molecular weight of the PBP component is lower than 200 kg·mol$^{-1}$, the tensile strength of the membrane can be too low, resulting in an unacceptably low puncture resistance thereof. If the weight average molecular weight of the PBP component is higher than 800 kg·mol$^{-1}$, extrusion of sheet during fabrication will be an issue.

The term "polypropylene-based polymer" as used herein broadly means any polymer that is considered a "polypropylene" by persons skilled in the art and includes homo, impact, and random copolymers of propylene. Preferably, the polypropylene used in the compositions described herein has a melting point above 110° C. and includes at least 90 wt % propylene-derived units. The polypropylene may also include isotactic, atactic or syndiotactic sequences, and preferably includes isotactic sequences. The polypropylene can either derive exclusively from propylene monomers (i.e., having only propylene-derived units) or comprises at least 90 wt %, or at least 93 wt %, or at least 95 wt %, or at least 97 wt %, or at least 98 wt %, or at least 99 wt % propylene-derived units with the remainder derived from olefins, such as ethylene, and/or $C_4$-$C_{10}$ alpha-olefins.

The PBP may have a melting temperature of from at last 110° C., or at least 120° C., or at least 130° C., and may range from 110° C. to 170° C. or higher as measured by DSC.

The PBP may have a melt flow rate ("MFR") as measured by ASTM D1238 at 230° C. and 2.16 kg weight of from about 0.1 to 20 g/10 min. For example, the PBP may have a fractional MFR of less than about 2 g/10 min, or less than about 1.5 g/10 min, or less than about 1 g/10 min. For example, the PBP may have a MFR of from a low of about 0.1, 0.2, 0.3, 0.4, 0.5, 0.6, 0.7, 0.8, 0.9, 1.0, 1.2, 1.4, 1.5, 1.6, 1.8, 2.0 or g/10 min to a high of about 5.5, 6.0, 6.5, 7.0, 7.5, 8.0, 8.5, 9.0, 9.5, 10, 11, 12, 13, 14, 15, 16, 17, 18, 19, or 20 g/10 min, where desirable ranges may include ranges from any lower limit to any upper limit. For example, the PBP may have a MFR of from a low of about 0.5, 1.0, 1.5, 2.0, 2.5 g/10 min to a high of about 5.0, 5.5, 6.0, 6.5, 7.0, 7.5, 8.0, 8.5, 9.0, 10, 11, 12, 13, 14, or 15 g/10 min.

The PBP component can be a propylene homopolymer made by using a Ziegler-Natta catalyst. Suitable polypropylene homopolymers are various grades thereof supplied from ExxonMobil Chemical Company, Houston, Tex., U.S.A., for example, grades PP5341, PP3155, and the like.

The Propylene-Based Elastomer ("PBE") Component

The PBE component in the composition and membrane of the present invention advantageously is an elastomer comprising structural units derived from propylene, at least one of ethylene and C4-C12 alpha-olefin monomer(s), and optionally one or more dienes. Preferably, the PBE component consists essentially of propylene and ethylene derived structural units (e.g., with total contents of propylene and ethylene-derived structural units of at least 95 wt %, 96 wt %, 97 wt %, 98 wt %, 99 wt %, based on the total weight of the PBE component), or consists only of propylene and ethylene derived units.

The PBE component may include structural units derived from ethylene at a quantity in the range from a1 wt % to a2 wt %, based upon the total weight of the PBE component, where a1 and a2 can be, independently, 8, 9, 10, 11, 12, 13, 14, 15, or 16, as long as a1<a2. The PBE may include up to about 30 wt %, up to about 25 wt %, up to about 22 wt %, up to about 20 wt %, up to about 19 wt %, up to about 18 wt %, or up to about 17 wt %, ethylene- or C4-C12 alpha-olefin-derived units, based upon the total weight thereof.

The PBE component may include structural units derived from propylene at a quantity in the range from b1 wt % to b2 wt %, based on the total weight of the PBE component, where b1 and b2 can be, independently, 70, 72, 74, 75, 76, 78, 80, 82, 84, 85, 86, 88, 90, 92, as long as b1<b2.

The PBE component of can be characterized by a melting point (Tm), which can be determined by differential scanning calorimetry (DSC). Using the DSC test method described herein, the melting point is the temperature recorded corresponding to the greatest heat absorption within the range of melting temperature of the sample. When a single melting peak is observed, that peak is deemed to be the "melting point." When multiple peaks are observed (e.g., principle and secondary peaks), then the melting point is deemed to be the highest of those peaks. It is noted that due to the low-crystallinity of many of the PBE components, the melting point peak may be at a low temperature and be relatively flat, making it difficult to determine the precise peak location. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE component (as determined by DSC) may be less than about 120° C., less than about 115° C., less than about 110° C., less than about 105° C., less than about 100° C., less than about 90° C., less than about 80° C., less than about 70° C., less than about 65° C., or less than about 60° C. For example, the PBE component may have a Tm of from about 20 to about 110° C., from about 30 to about 110° C., from about 40 to about 110° C., or from about 50 to about 105° C., where desirable ranges may include ranges from any lower limit to any upper limit. For example, the PBE component may have a Tm of from about 40 to about 70° C., or from about 45 to about 65° C., or from about 50 to about 60° C., where desirable ranges may include ranges from any lower limit to any upper limit. For example, the PBE component may have a Tm of from about 80 to about 110° C., or from about 85 to about 110° C., or from about 90 to about 105° C., where desirable ranges may include ranges from any lower limit to any upper limit.

The PBE component can be characterized by its heat of fusion (Hf), as determined by DSC. The PBE component may have an Hf that is at least about 0.5 J/g, at least about 1.0 J/g, at least about 1.5 J/g, at least about 3.0 J/g, at least about 5.0 J/g, at least about 7.0 J/g, at least about 10.0 J/g, or at least about 12 J/g. The component may be characterized by an Hf of less than about 75 J/g, less than about 65 J/g, less than about 60 J/g, less than about 55 J/g, less than about 50 J/g, less than about 40 J/g, less than about 35 J/g, less than about 30 J/g, less than about 25 J/g, less than about 20 J/g, less than about 17 J/g, or less than 15 J/g. For example, the PBE component may have a Hf of from about 1.0 to about 40 J/g, from about 3.0 to about 30 J/g, or from about 5.0 to about 20 J/g, where desirable ranges may include ranges from any lower limit to any upper limit. For example, the PBE component may have a Hf of from about 1.0 to about 15 J/g or from about 3.0 to about 10 J/g, where desirable ranges may include ranges from any lower limit to any upper limit. For example, the PBE component may have a Hf of from 5.0 to about 30 J/g, from about 7.0 to about 25 J/g, or from about 12 to about 20 J/g, where desirable ranges may include ranges from any lower limit to any upper limit.

As used herein, DSC procedures for determining Tm and Hf are as follows. The polymer is pressed at a temperature of from about 200° C. to about 230° C. in a heated press, and the resulting polymer sheet is hung, under ambient conditions, in the air to cool. About 6 to 10 mg of the polymer sheet is removed with a punch die. This 6 to 10 mg sample is annealed at room temperature for about 80 to 100 hours. At the end of this period, the sample is placed in a DSC (Perkin Elmer Pyris One Thermal Analysis System) and cooled to about −30° C. to about −50° C. and held for 10 minutes at that temperature. The sample is then heated at 10° C./min to attain a final temperature of about 200° C. The sample is kept at 200° C. for 5 minutes. Then a second cool-heat cycle is performed, where the sample is cooled to about −30° C. to about −50° C. and held for 10 minutes at that temperature, and then re-heated at 10° C./min to a final temperature of about 200° C. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE component has crystalline regions interrupted by non-crystalline regions. The non-crystalline regions can result from regions of non-crystallizable propylene segments, the inclusion of comonomer units, or both. In one or more embodiments, the PBE component has a propylene-derived crystallinity that is isotactic, syndiotactic, or a combination thereof. In a preferred embodiment, the PBE component has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE component can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, from about 80 to about 99%, from about 85 to about 99%, from about 90 to about 99%, from about 90 to about 97%, or from about 80 to about 97%. Triad tacticity is determined by the methods described in U.S. Pat. No. 7,232,871.

The PBE component may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE component may have a percent crystallinity of from about 0.5% to about 40%, from about 1% to about 30%, or from about 5% to about 25%, determined according to DSC procedures, where desirable ranges may include ranges from any lower limit to any upper limit. Crystallinity may be determined by dividing the Hf of a sample by the Hf of a 100% crystalline polymer, which is assumed to be 189 J/g for isotactic polypropylene.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm$^{-1}$ to 4000 cm$^{-1}$ is recorded and the monomer weight percent of ethylene can be calculated according to the following equation: Ethylene wt %=82.585−111.987X+30.045X2, where X is the ratio of the peak height at 1155 cm$^{-1}$ and peak height at either 722 cm$^{-1}$ or 732 cm$^{-1}$, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

The PBE component may have a density of from about 0.84 g/cm$^3$ to about 0.92 g/cm$^3$, from about 0.85 g/cm$^3$ to about 0.90 g/cm$^3$, or from about 0.85 g/cm$^3$ to about 0.87 g/cm$^3$ at room temperature, as measured per the ASTM D-1505 test method, where desirable ranges may include ranges from any lower limit to any upper limit.

The PBE component may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l}$$

where ηb is the intrinsic viscosity of the polymer and ηl is the intrinsic viscosity of a linear polymer of the same viscosity-averaged molecular weight (Mv) as the polymer. ηl=KMvα, K and α are measured values for linear polymers and should be obtained on the same instrument as the one used for the g' index measurement.

The PBE component has a weight average molecular weight in the range from MW(PEP)1 kg·mol$^{-1}$ to MW(PEP)2 kg·mol$^{-1}$, where MW(PEP)1 and MW(PEP)2 can be, independently, 5.0, 6.0, 7.0, 8.0, 9.0, 10, 15, 20, 25, 30, 35, 40, 45, and 50, as long as MW(PEP)1<MW(PEP)2. If the weight average molecular weight of the PBE component is lower than 5 kg·mol$^{-1}$, the membrane produced from the blend can be too soft, resulting in an unacceptably low puncture resistance thereof. If the weight average molecular weight of the PBE component is higher than 50 kg·mol$^{-1}$, the membrane produced from the blend can be too stiff, especially at low temperature such as below 0° C., resulting in difficulty of installation.

The molecular weight distribution (MWD equal to Mw/Mn) of the PBE component may be from about 0.5 to about 10, from about 0.75 to about 5, from about 1.0 to about 5, from about 1.5 to about 4, or from about 1.8 to about 3, where desirable ranges may include ranges from any lower limit to any upper limit.

The PBE component may have a Shore D hardness (ASTM D2240) of less than about 50, less than about 45, less than about 40, less than about 35, or less than about 20.

The PBE component may have a Shore A hardness (ASTM D2240) of less than about 100, less than about 95, less than about 90, less than about 85, less than about 80, less than about 75, or less than 70. For example, the PBE component may have a Shore A hardness of from about 10 to about 100, from about 15 to about 90, from about 20 to about 80, or from about 30 to about 70, where desirable ranges may include ranges from any lower limit to any upper limit.

For example, the PBE component is a propylene-based elastomer that has at least four, or at least five, or at least six, or at least seven, or at least eight, or all nine of the following properties (i) from about 10 to about 25 wt %, or from about 12 to about 20 wt %, or from about 16 wt % to about 17 wt % ethylene-derived units, based on the weight of the PBE component; (ii) a Tm of from 80 to about 110° C., or from about 85 to about 110° C., or from about 90 to about 105° C.; (iii) a Hf of less than about 75 J/g, or less than 50 J/g, or less than 30 J/g, or from about 1.0 to about 15 J/g or from about 3.0 to about 10 J/g; (iv) a Mw of from about 5 to about 50 kg·mol$^{-1}$, or from about 6 to about 40 kg·mol$^{-1}$, or from about 7 to about 30 kg·mol$^{-1}$, or from about 8 to about 20 kg·mol$^{-1}$; (v) a Mn of from about 3 to about 40 kg·mol$^{-1}$, or from about 4 to about 30 kg·mol$^{-1}$, or from about 5 to about 20 kg·mol$^{-1}$; (vi) a MWD of from about 1.0 to about 5, or from about 1.5 to about 4, or from about 1.8 to about 3; and/or (vii) a Shore D hardness of less than 30, or less than 25, or less than 20. For example, such PBE component is a reactor-blended PBE component as described herein.

Optionally, the PBE component may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). For example, the diene may be selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the PBE component comprises a diene, the diene may be present at from 0.05 wt % to about 6 wt %, from about 0.1 wt % to about 5.0 wt %, from about 0.25 wt % to about 3.0 wt %, or from about 0.5 wt % to about 1.5 wt %, diene-derived units, based upon the total weight of the PBE component.

Optionally, the PBE component may be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative grafting monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In embodiments wherein the graft monomer is maleic anhydride, the maleic anhydride concentration in the grafted polymer is preferably in the range of about 1 wt % to about 6 wt %, at least about 0.5 wt %, or at least about 1.5 wt %.

In preferred embodiments, the PBE component is a reactor grade or reactor blended polymer, as defined above. That is, in preferred embodiments, the PBE component is a reactor blend of a first polymer component and a second polymer component. Thus, the comonomer content of the PBE component can be adjusted by adjusting the comonomer content of the first polymer component, adjusting the comonomer content of second polymer component, and/or adjusting the ratio of the first polymer component to the second polymer component present in the PBE component.

In embodiments where the PBE component is a reactor blended polymer, the alpha-olefin content of the first polymer component ("$R_1$") may be greater than 5 wt %, greater than 7 wt %, greater than 10 wt %, greater than 12 wt %, greater than 15 wt %, or greater than 17 wt %, based upon the total weight of the first polymer component. The alpha-olefin content of the first polymer component may be less than 30 wt %, less than 27 wt %, less than 25 wt %, less than 22 wt %, less than 20 wt %, or less than 19 wt %, based upon the total weight of the first polymer component. For example, the alpha-olefin content of the first polymer component may range from 5 wt % to 30 wt %, from 7 wt % to 27 wt %, from 10 wt % to 25 wt %, from 12 wt % to 22 wt %, from 15 wt % to 20 wt %, or from 17 wt % to 19 wt %. Preferably, the first polymer component comprises propylene and ethylene derived units, or consists essentially of propylene and ethylene derived units.

In embodiments where the PBE component is a reactor blended polymer, the alpha-olefin content of the second polymer component ("$R_2$") may be greater than 1.0 wt %, greater than 1.5 wt %, greater than 2.0 wt %, greater than 2.5 wt %, greater than 2.75 wt %, or greater than 3.0 wt % alpha-olefin, based upon the total weight of the second polymer component. The alpha-olefin content of the second polymer component may be less than 10 wt %, less than 9 wt %, less than 8 wt %, less than 7 wt %, less than 6 wt %, or less than 5 wt %, based upon the total weight of the second polymer component. For example, the alpha-olefin content of the second polymer component may range from 1.0 wt % to 10 wt %, or from 1.5 wt % to 9 wt %, or from 2.0 wt % to 8 wt %, or from 2.5 wt % to 7 wt %, or from 2.75 wt % to 6 wt %, or from 3 wt % to 5 wt %. Preferably, the second polymer component comprises propylene and ethylene derived units, or consists essentially of propylene and ethylene derived units.

In embodiments where the PBE component is a reactor blended polymer, the PBE component may comprise from 1 to 25 wt % of the second polymer component, from 3 to 20 wt % of the second polymer component, from 5 to 18 wt % of the second polymer component, from 7 to 15 wt % of the second polymer component, or from 8 to 12 wt % of the second polymer component, based on the weight of the PBE component, where desirable ranges may include ranges from any lower limit to any upper limit. The PBE component may comprise from 75 to 99 wt % of the first polymer component, from 80 to 97 wt % of the first polymer component, from 85 to 93 wt % of the first polymer component, or from 82 to 92 wt % of the first polymer component, based on the weight of the PBE component, where desirable ranges may include ranges from any lower limit to any upper limit.

The PBE component is preferably prepared using homogeneous conditions, such as a continuous solution polymerization process. For example, the PBE component is prepared in parallel solution polymerization reactors, such that the first reactor component is prepared in a first reactor and the second reactor component is prepared in a second reactor, and the reactor effluent from the first and second reactors are combined and blended to form a single reactor effluent from which the final the PBE component is separated. Exemplary methods for the preparation of the PBE components may be found in U.S. Pat. Nos. 6,881,800; 7,803,876; 8,013,069; and 8,026,323 and PCT Publications WO 2011/087729; WO 2011/087730; and WO 2011/087731.

The Blend Composition

The blend advantageously comprises from c1 to c2 parts by weight of the PBP component, and c3 to c4 parts by weight of the PBE component, where c1 and c2 can be, independently, 10, 15, 20, 25, 30, 35, 36, 38, 40, 42, 44, 45, 46, 48, 50, 52, 54, 55, 56, 58, 60, 62, 64, 65, 70, 75, 80, 85, 90, as long as c1<c2, and c3 and c4 can be, independently, 20, 25, 30, 35, 36, 38, 40, 42, 44, 45, 46, 48, 50, 52, 54, 55, 56, 58, 60, 62, 64, 65, 70, 75, 80, as long as c3<c4. Preferably, c1=40, c2=65, c3=35, and c4=60. More preferably, c1=45, c2=55, c3=45, and c4=55.

Additionally or alternatively, the blend advantageously comprises from d1 to d2 wt % of the PBP component, and d3 to d4 wt % of the PBE component, based on the total weight of the PBP component and the PBE component, where d1 and d2 can be, independently, 10, 15, 20, 25, 30, 35, 36, 38, 40, 42, 44, 45, 46, 48, 50, 52, 54, 55, 56, 58, 60, 62, 64, 65, 70, 75, 80, 85, 90, as long as d1<d2, and d3 and d4 can be, independently, 20, 25, 30, 35, 36, 38, 40, 42, 44, 45, 46, 48, 50, 52, 54, 55, 56, 58, 60, 62, 64, 65, 70, 75, 80, as long as d3<d4. If the PBP component constitutes less than 10 wt % of the total weight of the PBP component and the PBE component, the membrane thus produced can have insufficient strength. If the PBP component constitutes more than 90 wt % of the total weight of these two components, the membrane produced from it can have an overly high elastic modulus resulting in unacceptable stiffness, making installation of the membrane made from the blend difficult to implement. Preferably, d1=40, d2=65, d3=35, and d4=60. More preferably, d1=45, d2=55, d3=45, and d4=55.

The blend described herein may have a Shore A hardness, as determined by ASTM-D2240 in the range of from 10 to 200, or from 20 to 150, or from 30 to 100, or from 40 to 75, or from 45 to 65.

The blend described herein may have a MFR, as measured according to ASTM D-1238 (2.16 kg weight @ 230° C.), greater than about 0.5 g/10 min, greater than about 1.0 g/10 min, greater than about 1.5 g/10 min, greater than about 2.0 g/10 min, or greater than about 2.5 g/10 min, or greater than about 3 g/10 min, or greater than about 3.5 g/10 min, or greater than about 4 g/10 min. The blend composition may have an MFR less than about 100 g/10 min, less than about 50 g/10 min, less than about 25 g/10 min, less than about 15 g/10 min, less than about 10 g/10 min, less than about 7 g/10 min. For example, the blend composition may have an MFR from about 0.5 to about 15 g/10 min, from about 1.0 to about 10 g/10 min, or from about 3 to about 7 g/10 min.

The blend may have a Vicat softening point, as measured according to ASTM D-1525 (200 g), of from about 10 to 100° C., or from about 20 to about 75° C., or from about 30 to about 60° C., or from about 35 to 50° C.

Process for Making the Blend

The blend can be made by various means. In one process, the polypropylene component and the propylene-ethylene component are separately and independently fabricated. The pre-fabricated polypropylene resin and the propylene-based elastomer components are then intimately mixed, and processed into the blend. Such mixing can be dry mixing in extrusion compounding, mixing with the aid of additional components such as a solvent, example being toluene, and the like. Additives, such as anti-oxidants, UV absorbers, inorganic fillers, and the like, may be added when blending the two polymer components together.

In an alternative process, ethylene and propylene are injected into a polymerization reactor and allowed to polymerize in the presence of a catalyst such as a metallocene catalyst, and the like, to form the propylene-ethylene component. The polypropylene component is added in a post-reaction step through a finishing extruder to form the mixture. The thus formed propylene-ethylene component is mixed intimately with the polypropylene material fed into the reaction vessel. The polymerization of ethylene with propylene in the reaction vessel can takes place mainly in solution.

For example, the blend of the present invention is prepared by combining the PBE component and PBP component and then pelletizing the blend compositions. Without being bound by theory, it is believed that, by pelletizing the blend composition before forming a fabricated article or before blending with other components can allow for a more homogeneous mixing between the PBE component and the PBP component is achieved. Therefore, for example, the roofing compositions described herein may be prepared by a method comprising the steps of: (a) combining (i) a propylene-based elastomer comprising at least about 60 wt % propylene-derived units and about 5 to about 25 wt % ethylene-derived units, based on total weight of the propylene-based elastomer and (ii) a PBP resin to form a blend; (b) pelletizing the blend to form a pellet composition; and (c) blending the pellet composition with other components to form a roofing membrane composition.

For example, the method of blending the PBP component and the PBE component may be to melt blend the components in an extruder, such as a single-screw extruder or a twin-screw extruder. Extrusion technology for polymer blends is well known in the art, and is described in more detail in, for example, PLASTICS EXTRUSION TECHNOLOGY, F. Hensen, Ed. (Hanser, 1988), pp. 26-37, and in POLYPROPYLENE HANDBOOK, E. P. Moore, Jr. Ed. (Hanser, 1996), pp. 304-348. Other blending methods may utilize a double-cone blender, ribbon blender, or a Farrel Continuous Mixer (FCM™).

Roofing Membrane Compositions

A roofing composition described herein may comprise, in addition to the blend composition described above, a variety of additives. The additives may include reinforcing and non-reinforcing fillers, antioxidants, stabilizers, processing oils, compatibilizing agents, lubricants (e.g., oleamide), antiblocking agents, antistatic agents, waxes, coupling agents for the fillers and/or pigment, pigments, flame retardants, antioxidants, and other processing aids known to the art. For example, the additives may comprise up to about 65 wt %, or up to about 60 wt %, or up to about 55 wt %, or up to about 50 wt % of the roofing composition. For example, the additives may comprise at least 5 wt %, or at least 10 wt %, or at least 15 wt %, or at least 20 wt %, or at least 25 wt %, or at least 30 wt %, or at least 35 wt %, or at least 40 wt % of the roofing composition.

For example, the roofing composition may include fillers and coloring agents. Exemplary materials include inorganic fillers such as calcium carbonate, clays, silica, talc, titanium dioxide or carbon black. Any type of carbon black can be used, such as channel blacks, furnace blacks, thermal blacks, acetylene black, lamp black and the like.

For example, the roofing composition may include flame retardants, such as calcium carbonate, inorganic clays containing water of hydration such as aluminum trihydroxides ("ATH") or Magnesium Hydroxide. For example, the calcium carbonate or magnesium hydroxide may be pre-blended into a masterbatch with a thermoplastic resin, such as polypropylene, or a polyethylene, such as linear low density polyethylene. For example, the flame retardant may be pre-blended with a polypropylene, an impact propylene-based elastomer, or polyethylene, where the masterbatch comprises at least 40 wt %, or at least 45 wt %, or at least 50 wt %, or at least 55 wt %, or at least 60 wt %, or at least 65 wt %, or at least 70 wt %, or at least 75 wt %, of flame retardant, based on the weight of the masterbatch. The flame retardant masterbatch may then form at least 5 wt %, or at least 10 wt %, or at least 15 wt %, or at least 20 wt %, or at least 25 wt %, of the roofing composition. For example, the roofing composition comprises from 5 wt % to 40 wt %, or from 10 wt % to 35 wt %, or from 15 wt % to 30 wt % flame retardant masterbatch, where desirable ranges may include ranges from any lower limit to any upper limit.

For example, the roofing composition may include UV stabilizers, such as titanium dioxide or Tinuvin® XT-850. The UV stabilizers may be introduced into the roofing composition as part of a masterbatch. For example, UV stabilizer may be pre-blended into a masterbatch with the PBP or other polymer materials, where the masterbatch comprises at least 5 wt %, or at least 7 wt %, or at least 10 wt %, or at least 12 wt %, or at least 15 wt %, of UV stabilizer, based on the weight of the masterbatch. The UV stabilizer masterbatch may then form at least 5 wt %, or at least 7 wt %, or at least 10 wt %, or at least 15 wt %, of the roofing composition. For example, the roofing composition comprises from 5 wt % to 30 wt %, or from 7 wt % to 25 wt %, or from 10 wt % to 20 wt % flame retardant masterbatch, where desirable ranges may include ranges from any lower limit to any upper limit.

Still other additives may include antioxidant and/or thermal stabilizers. In an exemplary embodiment, processing and/or field thermal stabilizers may include IRGANOX® B-225 and/or IRGANOX® 1010 available from BASF.

Roofing Membrane

Membrane can be made comprising the polypropylene/propylene-based elastomer blend of the present invention. Machines and processes known in the art for making polymer films, such as extrusion compounding and calendaring are typically adopted.

The roofing membrane advantageously has a multi-layer structure comprising at least one layer made of the blend according to the present invention. For example, the membrane can have three layers: a top layer, desirably with a light color such as white, made from a roofing composition described above, a bottom layer, desirably with a dark color such as black, made from another roofing composition described above, and an intermediate layer, desirably made from a material that reinforces the overall mechanical structure of the membrane. The intermediate layer can be any type of scrim including, but not limited to, polyester, fiberglass, fiberglass reinforced polyester, polypropylene, woven or non-woven fabrics (e.g. Nylon) or combinations thereof. Preferred scrims are fiberglass and/or polyester.

For example, a surface layer of the top and/or bottom of the membrane may be textured with various patterns. Texture increases the surface area of the membrane, reduces glare and makes the membrane surface less slippery. Examples of texture designs include, but are not limited to, a polyhedron with a polygonal base and triangular faces meeting in a common vertex, such as a pyramidal base; a cone configuration having a circular or ellipsoidal configurations; and random pattern configurations.

Useful roofing membranes may have a thickness of from 0.1 to 5 mm, or from 0.5 to 4 mm.

Application of Membrane

The membrane of the present invention is particularly advantageously used in roofing applications, especially in the roof structures of commercial buildings with relatively small sloping grade. The membrane functions to block liquid water and moisture from entering the building from the roof. The membrane may be designed to have a reflective top layer, which can reflect the sunlight thereby resulting in cooler buildings with substantial energy savings or the reduced need of thermal insulation below the membrane.

The membrane of the present invention can be made into rolls and/or sheets with specific dimensions (width, thickness, and length) predetermined according to the dimensions and shape of the roof intended to be covered by the membrane. The rolls and/or sheets can be shipped from the membrane manufacturer to the construction site and applied in-situ. Alternatively, rolls and/or sheets of the membrane of the present invention with standard dimensions may be cut into specific sizes and then applied at the job site. Due to the advantaged properties of the membrane of the present invention, especially the desired modulus at higher temperature and lower temperature, the membrane of the present application can be conveniently applied in a large range of temperature with relative ease, without the need of worry about its being too soft or propensity to puncture.

The roofing membranes may be fixed over the base roofing by any means known in the art such as via adhesive material, ballasted material, spot bonding, or mechanical spot fastening. For example, the membranes may be installed using mechanical fasteners and plates placed along the edge sheet and fastened through the membrane and into the roof decking. Adjoining sheets of the flexible membranes are overlapped, covering the fasteners and plates, and preferably joined together, for example with a hot air weld. The membrane may also be fully adhered or self-adhered to an insulation or deck material using an adhesive. Insulation is typically secured to the deck with mechanical fasteners and the flexible membrane is adhered to the insulation.

The present invention is further illustrated by the following non-limiting examples.

EXAMPLES

A high molecular weight polypropylene from ExxonMobil Chemical Company (PP5341E1) made by using a Ziegler-Natta catalyst, and a low-molecular weight propylene-based elastomer with an ethylene content of 12 wt % and Brookfield viscosity at 200° C. of 1012 centipoise, made by using solution polymerization in the presence of a metallocene catalyst were used as the polypropylene component and the propylene-based elastomer components, respectively.

Blends of polymers were prepared by melt blending in Brabender Plasticorder mixer at 150° C. The mixer had a chamber size of 50 $cm^3$ and roller-type mixer blades (Cast 304 stainless steel roller). Prior to each melt mixing, 40 grams of dry blend were prepared and homogenized in a plastic bag by shaking for about 30 seconds. The dry blend was then introduced into the mixing chamber at a roller velocity of 20 rpm. After filling the chamber and melting the components (1 minute), the rotor speed was increased to 50 rpm and the blend was mixed for 4-5 minutes. After this time the torque stabilized indicating homogenization of the components. The blend was collected after opening the hot mixer using a brass spatula. The mixer was carefully cleaned prior to each mixing.

The blends were characterized by the dynamic-mechanical thermal analysis (DMTA, RSA-G2 by TA Instruments). All samples were compression molded at 180° C. in a hot press for 3 minutes and quenched in a cold press for 2

Figure 2:
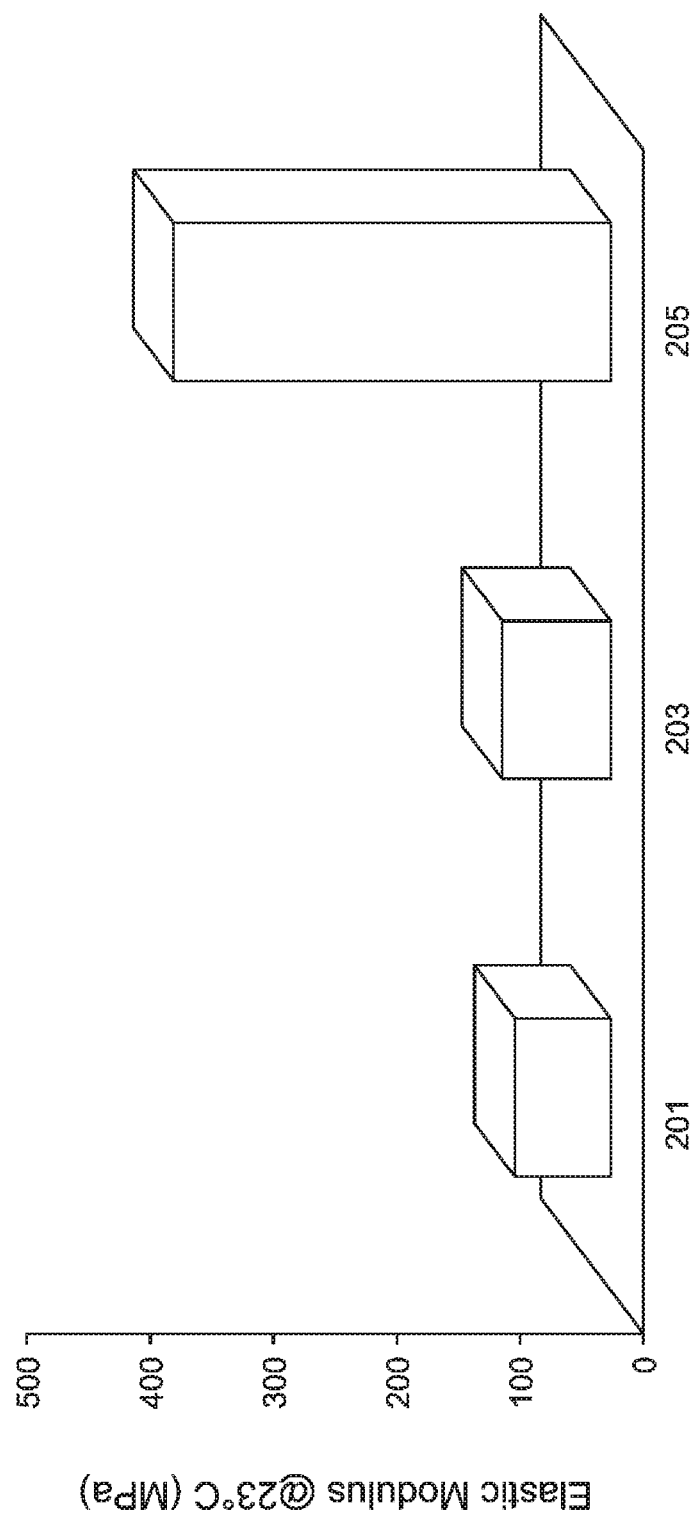
FIG. 2 is a diagram comparing elastic modulus at 23° C. of two blends of propylene-based polymers and propylene-based elastomers and a prior art roofing membrane material.

FIG. 2 shows the elastic modulus at 23° C. of three materials: Catalloy™ Hifax CA10A resin (201); a second inventive blend according to the present invention (203) which is made by using the same method as described above; and a second comparative blend (205). Compositions are provided in TABLE I below. Material 205 is a comparative material because of the high weight average molecular weight of the PBE component therein (221 kg·mol$^{-1}$). From FIG. 2, it can be seen that at 23° C., the inventive material 203 has comparable elastic modulus to material 201; while material 205 showed unacceptably high elastic modulus. Such high room temperature elastic modulus of material 205 renders it unsuitable for roofing membrane applications because of insufficient flexibility.

TABLE I

Material Components

| | | | PBP | | | | PBE | | | |
|---|---|---|---|---|---|---|---|---|---|---|
| Example | | Trade Name | Monomer(s) | Mw (kg·mol$^{-1}$) | Mn | Content in blend (wt %) | Monomer(s) | Ethylene content in PBE (wt %) | Mw (kg·mol$^{-1}$) | Mn | Content in blend (wt %) |
| 101 | Inventive | ExxonMobil PP5341E1 | Propylene | 457 | 131 | 45 | Propylene; ethylene | 12 | 26.6 | 11.9 | 55 |
| 103/201 | Comparative | Catalloy ™ Hifax CA10A | Propylene | N/D | N/D | N/D | Propylene; ethylene | N/D | >100 | N/D | N/D |
| 203 | Inventive | ExxonMobil PP5341E1 | Propylene | 457 | 131 | 50 | Propylene; ethylene | 12 | 26.6 | 11.9 | 50 |
| 205 | Comparative | ExxonMobil PP3155 | Propylene | 180 | 64 | 50 | Propylene; ethylene | 16 | 221 | 114 | 50 |

N/D: Not Determined minutes. The thickness of compression molded films was 0.35 millimeter. A strip of the film with dimensions 5 millimeters by 40 millimeters was cut with a sharp razor blade and the DMTA measurement was carried out at a single frequency of 1 Hz in uniaxial extension (amplitude of 0.05%, linear viscoelastic regime) in the temperature range from −60° C. to 120° C. at a heating rate of 2° C./minute.

FIG. 1 shows the elastic modulus of as a function of temperature of a first blend of the present invention (101) made by the process described above versus a comparative material (103), which is Catalloy™ Hifax CA10A resin available from Lyondell Chemical Company, Carrollton, Tex., U.S.A.). The comparative material, a polymer blend made by gas phase polymerization of propylene/ethylene mixture in a porous matrix of polypropylene, is widely used in roofing membranes due to its good combination of flexibility and strength at the application and use temperatures. The inventive first blend 101 consists of 45 wt % of a propylene homopolymer (ExxonMobil PP5431E1) and 55% of a propylene-based elastomer. Compositions of the materials are provided in TABLE I below. As can be seen, the first inventive blend 101 provides a combination of properties that is desirable for roofing membranes: a low temperature flexibility (easy installation even at low temperatures) and a high temperature stiffness (reduced blocking during installation). In fact, compared to the comparative material, the first inventive blend show both (i) appreciably lower elastic modulus at temperature below −30° C. and (ii) appreciably higher elastic modulus at temperatures higher than 75° C. Moreover, in the range from −15° C. to about 50° C., where outdoors installation of roofing membrane is most likely to occur, the blend of the present invention demonstrated more consistent elastic modulus in the most desirable range of modulus.

The invention claimed is:

1. A polymer blend comprising:
   40 to 65 parts by weight of a propylene-based polymer component having a weight average molecular weight of at least 200 kg·mol$^{-1}$, having at least 95 wt % propylene-derived units, and a melting temperature of at least 120° C.; and
   35 to 60 parts by weight of a propylene-based elastomer component comprising structural units derived from propylene and ethylene, having an ethylene content in a range from 8 to 16 wt %, based on the total weight of the propylene-based elastomer component, and having a weight average molecular weight in the range from 5 to 50 kg·mol$^{-1}$.

2. The polymer blend of claim 1, wherein the propylene-based elastomer component consists of structural units derived from propylene and structural units derived from ethylene.

3. The polymer blend of claim 1, wherein the propylene-based polymer has a melting temperature of at least 130° C.

4. The polymer blend of claim 1, comprising 45 to 55 parts by weight of the propylene-based polymer component; and 45 to 55 parts by weight of the propylene-based elastomer component.

5. The polymer blend of claim 1, wherein the propylene-based elastomer component has a weight average molecular weight in the range from 6 to 20 kg·mol$^{-1}$.

6. The polymer blend of claim 1, wherein the propylene-based polymer component has a weight average molecular weight of at most 800 kg·mol$^{-1}$.

7. The polymer blend of claim 6, wherein the propylene-based polymer component has a weight average molecular weight of at most 600 kg·mol$^{-1}$.

8. A membrane having a thickness of from 0.1 to 5 mm comprising the polymer blend of claim 1.

9. The polymer blend of claim 1, wherein the propylene-based elastomer component has an ethylene content in the range from 10 to 15 wt %, based on the total weight of the propylene-based elastomer component.

10. The polymer of claim 1, wherein the propylene-based elastomer component is produced by using a metallocene catalyst.

11. The polymer blend of claim 1, wherein the propylene-based polymer component is produced by using a Ziegler-Natta catalyst.

12. The polymer blend of claim 1, further comprising at least one of:
  a filler; a UV stabilizer; and an oxidization inhibitor.

13. A method for making a membrane, the method comprising:
  (i) providing a propylene-based elastomer component comprising structural units derived from propylene and ethylene, having an ethylene content in a range from 8 to 16 wt %, based on the total weight of the propylene-based elastomer component, and having a weight average molecular weight in the range from 5 to 50 kg·mol$^{-1}$;
  (ii) providing a propylene-based polymer component having a weight average molecular weight of at least 200 kg·mol$^{-1}$ and having at least 95 wt % propylene-derived units, and a melting temperature of at least 120° C.;
  (iii) mixing the propylene-ethylene component and the propylene-based polymer component to obtain a polymer blend material comprising 40 to 65 parts by weight of the propylene-based elastomer component; and 35 to 60 parts by weight of the propylene-based polymer component; and
  (iv) forming a membrane from the polymer blend material.

14. The method of claim 13, wherein the propylene-based polymer has a melting temperature of at least 130° C.

15. The method of claim 13, wherein in step (iii), the blend material comprises 45 to 55 parts by weight of the propylene-based polymer component; and 45 to 55 parts by weight of the propylene-based elastomer component.

16. The method of claim 13, wherein the propylene-based elastomer consists of structure units derived from propylene and ethylene.

17. The method of claim 13, wherein the propylene-based elastomer component has a weight average molecular weight in the range from 6 to 20 kg·mol$^{-1}$.

18. The method of claim 13, wherein the propylene-based polymer component has a weight average molecular weight of at most 800 kg·mol$^{-1}$.

19. The method of claim 18, wherein the propylene-based polymer component has a weight average molecular weight of at most 600 kg·mol$^{-1}$.

20. The method of claim 13, the membrane having a thickness of from 0.1 to 5 mm.

21. The method of claim 13, wherein the propylene-based elastomer component has an ethylene content in the range from 10 to 15 wt %, based on the total weight of the propylene-based elastomer component.

22. The method of claim 13, wherein in step (iii), the propylene-based elastomer component and the propylene-based polymer component are further mixed with at least one of: a filler; a UV stabilizer; and an oxidization inhibitor.

23. A method for insulating a roof top, comprising (A) applying at least one layer of a membrane comprising a polymer blend according to claim 1.

24. The polymer blend of claim 1, wherein in the range from −15° C. to about 50° C. the blend has a consistent elastic modulus.

25. The method of claim 13, wherein in the range from −15° C. to about 50° C. the blend has a consistent elastic modulus.

* * * * *